INVENTOR:
Rudolf Becker

3,421,332
FLUSHING WITH RESIDUAL UNCONDENSED GAS MIXTURE AFTER VACUUM REMOVAL OF CONDENSED COMPONENTS
Rudolf Becker, Munich-Solln, Germany, assignor to Gesellschaft fur Linde's Eismaschinen Aktiengesellschaft, Wiesbaden, Germany, a corporation of Germany
Filed Dec. 14, 1964, Ser. No. 418,234
Claims priority, application Germany, Dec. 13, 1963, G 39,373
U.S. Cl. 62—13                                2 Claims
Int. Cl. F25j 3/02

ABSTRACT OF THE DISCLOSURE

Method for the purification of gases and especially for the removal of HCN, $CO_2$, $H_2S$, $C_2H_4$, for example, from coke-oven gas in a low-temperature installation wherein these gas components are fractionally condensed in heat exchangers, and the heat exchangers are subjected to an exhaust period to eliminate all residual oven gas without substantial volatilization of the condensate; the condensate is subsequently extracted under vacuum without admission of any scavenging gas to the heat exchanger. A final flushing by the gases discharged from the condensate-containing exchanger and cooling of the heat exchanger by the pure gas, thereby preparing the heat exchanger for subsequent condensation, completes the cycle.

---

Figure 1:
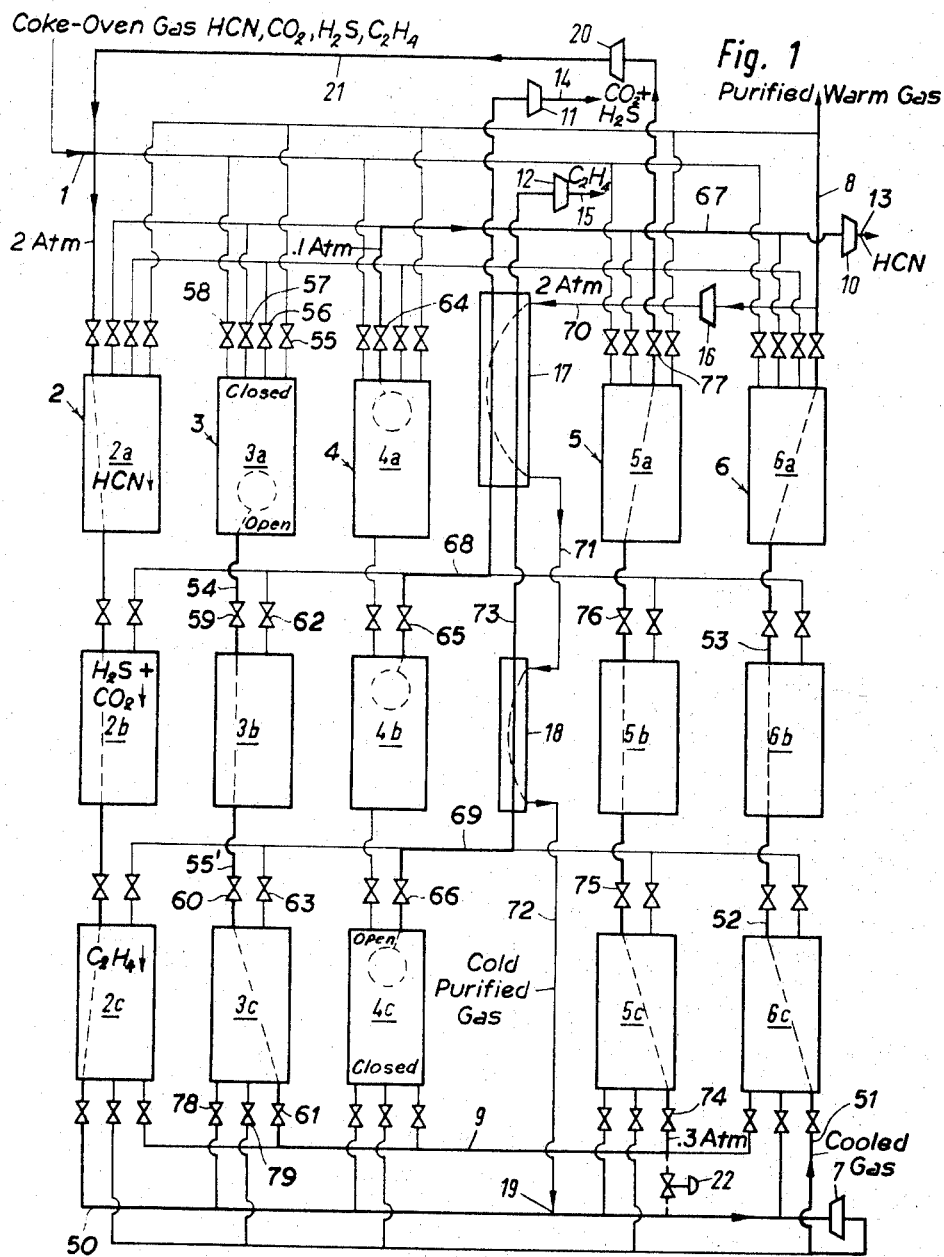

The present invention relates to a method of and an installation for the recovery of gaseous components of gas mixtures in relatively enriched and substantially undiluted states with the aid of periodically interchangeable heat exchangers and, more particularly, heat exchangers containing heat-storage masses and subjected to regenerative utilization of thermal energy.

In my copending application Ser. No. 389,612, filed Aug. 14, 1964 and entitled Process and Installation for the Removal of Easily Condensable Components From Gas Mixtures, now Patent No. 3,364,686, I describe a system whereby regenerative heat exchangers, using heat-storage masses, are employed for the removal of easily condensable components such as water vapor and carbon dioxide from gas mixtures to be subjected to further rectification in, for example, plants in which nitrogen, oxygen and other less readily condensable components are separated from one another. Others have described systems in which regenerative heat exchangers are employed for the recovery of valuable constituents of gas streams by selective condensation or for the purification of gas streams containing undesirable but condensable components which are removed from the gas to be purified. Prior efforts along these lines have made use of systems in which condensation of the condensable components was effected concurrently with a warming of the heat-storage mass, the regenerator being freed from the condensate by the counterflow of a purified cold gas during one or more flushing periods. The flushing gases commonly used included gases foreign to the original mixture, part of the purified gas mixture, residual gases from other processes and, as described in my copending application and patent mentioned above, gaseous components removed from the purified gas stream in a rectifying installation. In all these systems, however, the condensed component is recovered in admixture with the flushing gas and is thus in diluted form so that subsequent separation steps, e.g., via absorption or fractional condensation, are required at considerable expense. It has been proposed to avoid costly separation procedures by using as the flushing gas a stream having the same composition as the condensate and passed through the regenerator at room temperature. Thus it is possible to recover the condensate in an undiluted and uncontaminated form although, for this purpose, considerable care must be taken to insure constancy of composition, while heating devices must additionally be provided. Even more significant, however, is the fact that the heat exchanger, thus warmed to room temperature or some other temperature well above the condensation level, must be brought again to the relatively low temperature of condensation at the expense of considerable cooling capacity. The refrigeration apparatus required for a system of this type must, consequently, have a much larger capacity and be of increased dimensions, thereby reducing substantially the gains made by preventing dilution of the desired components.

It is the principal object of the present invention to provide a system for the separation of condensable components from gas mixtures whereby the components can be recovered economically and efficiently without significant dilution by flushing fluids and the like.

Still another object of this invention is to provide a method of and an installation for the recovery of condensable components which can be carried out with little need for additional cooling capacity and with maximum utilization of the cooling capabilities of the gas stream.

These objects and others, which will become apparent hereinafter, are based upon the discovery that condensable components recovered from a gas stream in a regenerative heat exchanger can be obtained economically and without material dilution by following the condensation step with a step termed, for convenience, an "exhaust" step in the course of which the heat exchanger is exposed to a somewhat reduced pressure for a period sufficient to remove residual gases introduced during the condensation period (i.e., crude gas from which the condensate has been removed), the exhaust step being followed by a vacuum stage at which the condensate is vibrated and removed in substantially undiluted form. I have found, surprisingly, that while use of a vacuum period directly after condensation during a separation period, without flushing, leads to recovery of most of the condensate in uncontaminated form, it is possible to prevent the little contamination which may occur without material loss of the product whose recovery is desired by introducing an exhaust period in which the pressure is dropped from the condensation pressure to a somewhat lower one which is nevertheless above the vacuum pressure to be subsequently applied for stripping the condensate from the heat exchanger.

Thus the major part of the condensate is removed only with the aid of vacuum vaporization without flushing with a fluid. The reduced pressure during the vacuum period must, accordingly, be below the partial pressure of the component at the cold end of the separating heat exchanger to ensure substantially complete removal of the precipitated component. A complete vaporization of the precipitated substance is, however, not possible in practice exclusively through the provision of a vacuum. In cases in which the residual quantities of the component would contaminate the purified gas passed through the regenerator during the cooling step, it is desirable, according to the present invention, to flush the heat exchanger subsequently to the removal of the major part of the precipitated component with a flushing gas at a reduced pressure which is, however, higher than the pressure during the vacuum period. The pressure during flushing should not, however, be as great as that employed during the precipitating stages.

The sequential use of a vacuum period and a flushing period provides substantial advantages in other cases as well. Thus, when the precipitated component is of only limited concentration in the crude-gas mixture and the energy required for effective separation is out of proportion to the quantity recoverable, the present invention provides that the flushing fluid containing residual quantities of the condensable component can be admixed with the crude-gas mixture to enrich it in the component whose separation is desired without the need for separate facilities to eliminate this component from the flushing gas. The flushing gas can, therefore, consist of a fraction of the purified and cooled gas emerging from either the heat-exchanger stage at which precipitation occurs or a subsequent stage, e.g., upon emergence from regenerators cooled by the purified-gas mixture.

As previously noted, upon switchover of a regenerative heat exchanger from a condensation mode to the vacuum-removal mode, there is the possibility that the condensate will be contaminated by the remaining crude gas or that that crude gas remaining in the regenerator will be lost for all practical purposes. It has been found that these difficulties can be avoided when the exhaust period is interposed between the condensation and vacuum-removal periods, the pressure in the regenerator being reduced from the crude-gas pressure to a lower pressure, the gases removed during this exhaust step being either fed back to the crude gas, introduced into a regenerator at which cold-gas warming is effected, subjected to low-temperature rectification, or employed as a flushing gas in a regenerator operating in this mode; the latter use is preferable.

According to another aspect of the present invention, particularly advantageous results are obtained when the gas derived during the exhaust period is removed from the cold end of the heat exchanger, which is preferably of the regenerative type, and, alone or in admixture with purified cold gas, is used as a flushing fluid for the complete evaporation of residual condensate of another regenerator and then returned to the crude-gas mixture to enrich the latter in the component removed during flushing and evaporated during the exhaust period. In systems in which the gas removed during the exhaust step does not serve as the flushing gas or in which the flushing period is eliminated entirely, a regenerator at which the flushing is carried out simultaneously with other processes in other stages can be dispensed with; in this case, the cycle of operation is such that the condensation and warming step, the cooling step preliminary to condensation, and the vacuum-removal step taken together with the exhaust step occupy similar time periods, the exhaust period being only a fraction of the total period of operation at each stage.

When a number of components having different dewpoints are to be recovered from a gas mixture and separated from one another, each of the regenerator stages, which, as mentioned earlier, can include a condensation stage, an exhaust stage, a vacuum-removal stage, a flushing stage and a cooling stage preparatorily to condensation, comprises a number of regenerators connected in series and at successively lower temperatures at least during condensation so as to remove respective components from the gas mixture. The installation is, moreover, provided with means whereby each of the regenerative heat exchangers of a particular stage can be discharged individually during the vacuum-removal period so as to yield the respective component free from contamination by any other component. In this case, components are to be considered in terms of their dewpoints, it being noted that substances having similar or closely related dewpoints can constitute a single component recoverable in a particular heat exchanger.

According to a further feature of my present invention, the cold or low-temperature content (i.e. heat-absorption capacity) of the removed components can be exploited without disadvantageous dilution when one or more of these components are passed countercurrent through a heat exchanger in heat-transferring relationship (via a wall) with a warm gas, e.g. with cooling of part of the purified warm gas emerging from the regenerative heat exchangers for subsequent use (preparatorily to separation of the components of the crude gas). The heat-absorption capacity of the gas supplied to the regenerators, to bring them to the low temperatures at which condensation of the components occurs, can be provided by expansion of the purified gas emerging from regenerative heat exchangers of the stage in which condensation is being effected. Thus, an expansion turbine or the like, whose mechanical energy can be used to drive compressors, suction pumps or the like directly or via auxiliary power plants (e.g. electrical generators), can serve as the expansion means and may be interposed between the heat-exchanger stage at which condensation is taking place and that which is brought to the condensation temperature.

The heat-exchanger installation of the present invention thus consists of at least three heat exchangers of interchangeable function and provided with valve means with corresponding ducts enabling the connection of the heat exchangers at their warm ends (subsequently to condensation of the respective components of the gas stream) with a respective vacuum pump whereby the major part of the removal by the precipitated component can be effected. The installation should include first, second and third valve and duct means permitting interchangeable switching of the heat exchangers and their selective connection with the vacuum pump at their cold ends. The first duct means can be selectively operable to deliver the crude-gas mixture to one of the heat exchangers while the second duct means is provided to supply the cold but purified gas, substantially freed from the condensed component, from this first heat exchanger to a second heat exchanger, preferably via the expansion means, thereby cooling the second heat exchanger. The third heat exchanger, having previously been used for condensation of the component to be extracted, is provided with the third duct means connecting its warm end with the vacuum pump. Each of the first, second and third duct means is, moreover, provided with respective valve means for connecting the second heat exchanger (after it has been sufficiently cooled) to the source of crude gas while the first heat exchanger is connected to the vacuum pump via its warm end and the third heat exchanger is supplied with the cooling fluid by the second duct means. Additional means can be provided for the temporary subjection of the heat exchangers via their cold ends to a reduced pressure sufficient to exhaust residual gases just prior to the vacuum stage and without significant removal of the component whose recovery is desired. The installation is, of course, fully equipped with automatic controls for the valve means to time the exhaust and vacuum periods and the functional interchange of the heat exchanger.

In general, however, it is desirable to employ five distinct operating periods or modes in each cycle of regenerator use—namely, the condensing period in which the deposit is formed; the exhaust period in which the regenerator pressure is lowered to remove residual purified or unpurified gas mixture; the vacuum period in which the precipitated component is removed without dilution; the flushing period in which any residual condensate is eliminated in a gas stream; and the cooling period in which a regenerator, previously cleansed by flushing, is brought to a temperature sufficient to effect precipitation. The installation will thus be provided with five heat-exchanger stages with associated valve and duct means permitting functional interchange, as indicated above. When the installation is operated without a flushing period, a corresponding heat-exchanger stage can be eliminated, a further heat exchanger being dispensed with when the exhaust and vacuum steps are carried out in a single heat exchanger for relatively short and relatively long periods of time during each cycle of operation. Each stage of the installation can include a number of serially connected units at successively higher temperatures corresponding to the condensation temperatures of the different components to be recovered. In this case, valve and duct means are provided for each of the units of each stage, enabling them to be connected individually to respective vacuum pumps whereby the major part of the precipitated substances can be removed without contamination by other precipitated substances.

Figure 2:
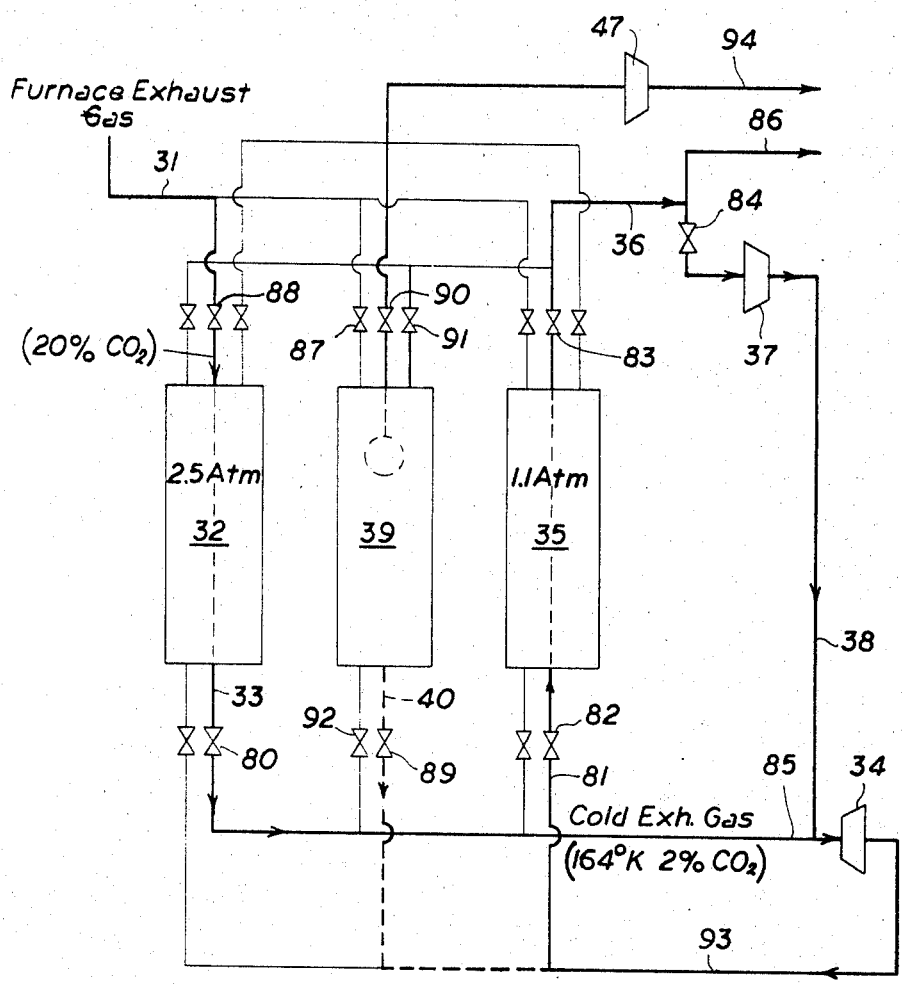

The above and other objects, features and advantages of the present invention will become more readily apparent from the following specific example and description reference benig made to the accompanying drawing in which:

FIG. 1 is a flow diagram representing an installation for recovering three components from a gas mixture according to the present invention; and FIG. 2 is a similar diagram of an installation for the removal of a single component present in relatively high proportion in a gas mixture.

In FIG. 1 I have shown an installation for the separation of relatively high-boiling components from gas mixtures, this installation being suitable for the recovery of, for example, hydrogen cyanide, carbon dioxide, hydrogen sulfide and ethylene from coke-oven gasses or for the removal of components from a rectification mixture of air or the like with one or more high-boiling components such as water or carbon dioxide. The installation, described for the separation of high-boiling components from a coke-oven gas in three fractions having distinct boiling-point ranges, namely a hydrogen cyanide fraction, a hydrogen sulfide and carbon dioxide fraction and an ethylene fraction, includes an inlet duct 1 through which the coke-oven gas mixture containing these fractions is fed to the installation. The installation is subdivided into a plurality of interchangeably functioning stages 2, 3, 4, 5, 6, each of which has at least one regenerative heat exchanger associated with a respective fraction to be removed from the crude-gas mixture. Thus, the crude gas introduced at duct 1 is fed through the ganged or series-connected regenerative heat exchangers 2a, 2b and 2c which have been previously cooled to successively lower temperatures as will become apparent hereinafter. The gas is fed at a pressure of about 2 atm. to the regenerative heat exchangers 2a, 2b and 2c, in the first of which hydrogen cyanide precipitates from the gas mixture and deposits upon the heat-storing medium, while in the second heat exchanger 2b hydrogen sulfide and carbon dioxide precipitate; in the third heat exchanger 2c, ethylene is liquefied and removed from the crude-gas stream. The purified cold gas is led from the cold end of the last heat exchanger 2c of this group via a line 50 to a turbine 7 in which it is expanded, the turbine energy being employed to drive the vacuum turbines, electrical generating means for pumps and the like or any other appliance capable of rotational drive from this turbine. The purified gas, further cooled by this expansion in turbine 7, is conducted by a pipe 51 through the heat exchangers 6c, 6b and 6a in succession (via lines 52 and 53), thereafter leaving the apparatus at duct 8 as a purified and warmed gas. Since the cold pure gas passes through the regenerators 6a, 6b and 6c in reverse order with reference to that in which the warm crude gas is supplied, the heat-storage mass in regenerator 6c is brought to a temperature lower than that of regenerator 6b which, in turn, is brought to a temperature below that of heat exchanger 6a. The expansion of gas in turbine 7 is so carried out that the temperature in heat exchanger 6c will be sufficiently low to effect precipitation of substantially all of the ethylene during the next removal cycle, while the temperature of regenerator 6b suffices to eliminate substantially all of the hydrogen sulfide and carbon dioxide from the crude gas and the temperature of regenerator 6a is low enough to eliminate from the gas substantially all of the hydrogen cyanide. The purified warm gas at line 8 can be discarded if it has no further use or, in the case of rectification fractions, can be further separated by very-low-temperature distillation as in the case of air separations and the like. During the removal of the relatively high-boiling components at regenerative heat exchanges 2a–2c and the cooling of the heat exchangers 6a–6c, the regenerative heat exchangers 3a, 3b and 3c which, in the previous period, performed the functions of heat exchangers 2a, 2b and 2c, respectively, are subjected, according to this invention, to a rapid-exhaust period at a reduced pressure such that only very minor portions of the hydrogen cyanide deposited as a liquid in heat exchanger 3a, the hydrogen sulfide and carbon dioxide precipitated in heat exchanger 3b and the ethylene of heat exchanger 3c are respectively evaporated by a relatively sudden reduction in pressure and led off together with residual purified or impure coke-oven gas. Thus, while the pressure during removal of these high-boiling fractions is approximately 2 atm., the pressure is reduced to approximately 0.3 atm. during the exhaust period. The gaseous substances from the heat exchangers 3a–3c are drawn off via line 9' and connecting lines 54 and 55' in series with the heat exchangers and are employed, as will be apparent hereafter, as rinsing or flushing gases. During the low-pressure period, each of the valves 55, 56, 57 and 58 leading to the regenerator 3a is closed while valves 59, 60 and 61 in lines 54, 55', 9 remain open and valves 62 and 63 are closed.

The major part of the low-boiling constituents, which are precipitated from the crude gas during the condensation step and which remain after the exhaust step, is removed during a vacuum step as set forth above. For this purpose, the warm or high-temperature ends of each of the heat exchangers (e.g., heat exchangers 4a, 4b and 4c which have previously undergone an exhaust period) are connected via valves 64, 65, 66 to respective vacuum pumps 10, 11 and 12 by way of lines 67, 68 and 69, respectively, the vacuum pumps being capable of maintaining a reduced pressure of about 0.1 atm. during the vacuum period. From the outlet pipe 13 of pump 10, therefore, hydrogen cyanide (HCN) is recovered, while carbon dioxide ($CO_2$) and hydrogen sulfide ($H_2S$) are recovered at outlet pipe 14 of pump 11 and ethylene ($C_2H_4$) is recovered at outlet pipe 15 of pump 12.

In order to exploit the low temperature and heat-absorption capacity of the cooled gases removed during the vacuum step, pipe 69 carrying the ethylene at the lowest temperature passes through a compartment-type heat exchanger 18 countercurrent to the gas passing through pipes 70, 71 and 72. From heat exchanger 18, pipe 73 conducts the slightly warmed ethylene fraction to another heat exchanger 17 from which it passes to the vacuum pump 12 while pipe 65 carries the cold hydrogen sulfide and carbon dioxide through heat exchanger 17. The heat exchangers 17 and 18 thus serve to cool a fraction of the purified warm gas emerging from regenerator 6a via line 8, this portion of the purified warm gas being compressed at 16 to the pressure of the crude gas and being recombined with the cooled and purified crude gas at junction 19 prior to the entry thereof into the expansion turbine 7. The undiluted fractions are thus recovered in a warmed state.

In the subsequent flushing period, the heat exchangers 5a, 5b, 5c are again connected in series and are maintained at a reduced pressure by a suction pump 20. The flushing gas can be that derived at line 9 from the heat exchangers 3a, 3b and 3c which have just previously been or are concurrently subjected to the exhaust step. From duct 9, the so-called "exhaust" gas, which is relatively rich in the high-boiling fractions removed from the coke-oven gas, is led over valves 74, 75, 76 and 77 through the regenerative heat exchangers 5c, 5b and 5a before being added via the suction pump 20 as an enriching fluid to the coke-oven gas via line 21, thereby increasing the concentration of hydrogen cyanide, hydrogen sulfide, carbon dioxide and ethylene in this crude gas and rendering the separation process more efficient. The flushing gas removes all of the condensate which has previously deposited in the heat exchangers 5a–5c but has not been vaporized during the vacuum period. The flushing-gas pressure is, advantageously, about 0.3 atmosphere (i.e., greater than the vacuum-period pressure), and the suction pump 20 is provided to bring it to the pressure of the coke-oven mixture. Valves 74–77 are reproduced in each stage (e.g., as the valves 61, 60, 59 and 56) while each of the stages is provided with a similar set of valves for the five stages of operation. As to the five stages of operation of each group of regenerative heat exchangers (e.g., those shown at 3a–3c), it will be evident that valves 55–57 are closed while valve 58 is opened during passage of the coke-oven gas through the heat exchangers 3a, 3b and 3c in succession; for this purpose, valves 59, 60 and 78 are also opened while valves 62, 63, 61 and 79 are closed. After condensate has deposited in the heat exchangers, valves 55–58 are closed as are valves 62, 63, 78 and 79 while valves 59 through 61 remain open to permit the rapid exhausting of the heat exchangers 3a–3c by suction pump 20 and the use of the gases thus produced by evaporation of condensate as a flushing or rinsing gas. Valves 59 and 60 are then closed while valves 62 and 63 are opened along with valve 57, valves 55, 56, 58, 78 and 79 remain closed together with valve 61. Each of the heat exchangers 3a, 3b or 3c is thus subjected to the vacuum period at the reduced pressure of the respective suction pump 10, 11 or 12, the individual condensates being thereby vaporized; heat exchange is carried out concurrently to utilize the heat-adsorption capacity of the relatively undiluted fractions in the units 17 and 18. During a fourth stage of operation, valve 61 is opened along with valves 60, 59 and 56, while the remaining valves are closed to permit the suction pump 20 to draw a flushing fluid produced in another set of regenerative heat exchangers through the exchangers 3a–3c and eliminate residual condensate. During the fifth operation period, valves 59 and 60 remain opened while valve 56 is closed and valves 55 and 79 are opened to permit the purified coke-oven gas to be dispatched from expansion turbine 7 through the heat exchangers 3c, 3b, 3a, in succession, to bring these units to their operating temperatures for further condensation.

Thus, the heat exchangers 2a–2c are paired with heat exchangers 6c–6a for regenerative cooling of the latter prior to separation of components of the gas mixture, whereas heat exchangers 3a–3c are similarly paired with heat exchangers 2a–2c and exchangers 4a–4c are paired with exchangers 3a–3c, exchangers 5a–5c being paired with exchangers 4a–4c.

Similarly, for flushing purposes, the heat exchangers generally designated with the reference numeral 2 are paired with the heat exchangers 4, while the heat exchangers 4 and 6 are similarly paired during the appropriate period. When a gas designed to serve as the flushing fluid is not obtained in sufficient quantity by the exhaust stage previously described, it may be supplemented by addition thereto, prior to introduction into the heat exchangers to be flushed, of cooled purified gas from line 50 shunted via a valve 22 to the line 9.

In FIG. 2 I show a simplified system particularly suitable for the recovery of carbon dioxide from exhaust gases containing relatively large proportions of this component. The exhaust gas is led via a duct 31 at an elevated pressure to the regenerative heat exchanger 32 which, like the regenerative heat exchangers of stages 2–6 of FIG. 1, can be filled with heat-storage masses or the like upon which the relatively high-boiling fractions deposit during condensation.

In the previously cooled regenerative heat exchanger 32, carbon dioxide condenses while the exhaust gas is led via a valve 80 and line 33 at a relatively low temperature and with reduced carbon dioxide content to the turbine 34 in which it is expanded to a lower pressure and thus further cooled prior to being fed via line 81 and valve 82 to cool the regenerative heat exchanger 35. The relatively purified gas is thus warmed and conducted via conduit 36 and valve 83 out of the installation. In order to raise the temperature of the gases fed to the expansion turbine 34, which is the equivalent of turbine 7 of the system of FIG. 1, a portion of the warmed and purified gas can be diverted from line 36 via valve 84 and compressed at the compressor 37 prior to being led to the cold-gas line 85 by the duct 38. Compressor 37 can, of course, be driven by the turbine 34. The remainder of the warm and purified gas is discharged at line 86. While the regenerative heat exchanger 32 is being warmed and receives a deposit of the condensate, and heat exchanger 35 is cooled preliminarily to serving as a precipitation chamber for removal of the readily condensable component, the previously operative regenerator 39 is subjected in succession to the exhaust and vacuum periods. Thus, immediately after the flow of furnace exhaust gas via line 31 has been terminated by closing valve 87 and opening valve 88 to switch the exhaust gas to the regenerator 32, valve 89 of regenerator 39 is opened while valves 90 and 91 are closed together with valve 92, the warm end of regenerator 39 being thus completely closed. Valve 89 is open only for a short period sufficient to subject the regenerative heat exchanger 39 via its cold end to the somewhat lower pressure of line 93 by means of which the expanded and purified cold gas is led to regenerative heat exchanger 35. After the exhaust period, valve 89 is closed while valve 90 is opened to subject the heat exchanger 39 to the reduced pressure of suction pump 47 which discharges the carbon dioxide from the unit in an undiluted state. The vacuum-removal pressure is so chosen that it is less than the partial pressure of the carbon dioxide in cold yet unexpanded exhaust gas. The vacuum period constitutes the major part of the cycle duration while the exhaust step is in effect only for a small fraction of this time. Subsequently to removal of carbon dioxide from regenerator 39, the latter can be connected with the line 93 to permit cooling fluid to flow therethrough while heat exchanger 35 is used for removal of the high-boiling fraction and heat exchanger 32 is subjected successively to the exhaust and vacuum periods. The separation, cooling and removal (i.e. exhaust and vacuum) periods can occupy identical times. The use of a single regenerator for successive exhaust and vacuum stages during each cycling period eliminates the need for an additional regenerative cooling stage. Similarly, the omission of a flushing period distinct from the cooling cycle avoids the need for an additional heat exchanger. It should be noted, however, that this is economical only when the concentration of carbon dioxide or other relatively high-boiling components is high and enrichment of the input gas is not required. With low concentrations of high-boiling components as described, for example, with respect to the installation of FIG. 1, feedback-type enrichment by recycling the flushing gas is desirable. The expansion in turbines 7 and 34 is so arranged as to ensure sufficient cooling of the purified gas that the latter is able to bring the regenerator subsequently used for recovery of the condensable components to the desired condensation temperatures.

The system of FIG. 2 is employed for the recovery of a single substantially pure and undiluted component (e.g. carbon dioxide) from a furnace exhaust gas. The furnace exhaust gas is introduced at 31 at a pressure of 2.5 atmospheres and contains approximately 20% carbon dioxide. Condensation of carbon dioxide is carried out in regenerator 32 and the purified exhaust gas fed to the expansion turbine 34 is at a temperature of 164° K. (Kelvin) and contains about 2% carbon dioxide. The cooling requirements are such that the gas must be expanded to a pressure of 1.1 atmospheres in the turbine 34 and is passed at this pressure through the regenerator 35 to cool the latter to the temperature required for the subsequent condensation stage. Thus, during the exhaust period, the cooled end of regenerative heat exchanger 39 is subjected to a pressure of 1.1 atmospheres for a period of about 5 seconds, thereby relieving the heat-exchanger pressure (previously at 2.5 atmospheres) and eliminating residual exhaust gas along with a very minor amount of carbon dioxide.

The subsequent vacuum-removal stage using the suction of vacuum pump 47 is carried out at a reduced pressure of 0.04 atmosphere and the output via duct 94 is found to be approximately 95% of the carbon dioxide previously determined to have constituted part of the exhaust gas mixture, the recovered carbon dioxide being in undiluted form. The suction pressure is so chosen as to be below the partial pressure of the component extracted in the purified cold gas, as previously mentioned. Thus, the suction pressure must be less than 0.05 atmosphere when the purified crude gas is at a pressure of 2.5 atmospheres and contains 2% carbon dioxide.

I claim:

1. A method of operating an installation for the recovery of components of a gas mixture, said installation including at least one heat exchanger operating successively on a feed-cooling cycle to precipitate a condensable component, an exhaust cycle to remove the residual non-condensed gases, a vacuum cycle to remove condensed impurities and a flushing cycle to remove residual precipitate, said method comprising the steps, in sequence, of:
  (a) cooling said heat exchanger to a temperature below that at which a gaseous component of said gas mixture condenses;
  (b) passing the gas mixture containing said component through said heat exchanger to condense said component therein with retention of an uncondensed residue of said gas mixture;
  (c) terminating the flow of said mixture through said heat exchanger upon condensation of the component therein;
  (d) withdrawing from said heat exchanger, after termination of flow, the uncondensed residue remaining therein after step (c) without removing a significant quantity of the condensate of said component; the said heat exchanger comprising a plurality of zones of successively decreasing temperatures, separate impurities being deposited in each of the respective zones as discrete condensate;
  (e) thereafter removing at least the major part of the discrete condensate components deposited in said heat exchanger in step (b), without admitting uncondensed residue gas to said respective zones, by applying to each of said respective zones a subatmospheric pressure sufficient to evaporate said condensate by separate and distinct vacuum pumps corresponding to the number of zones and draw the respective volatilized condensate out of each of said zones substantially free from other constituents; directing the uncondensed gas mixture from step (d) through another part of the heat exchanger from which the major part of the condensate has been removed in step (e); and
  (f) periodically repeating steps (a) to (e).

2. A method of operating an installation for the recovery of components of a gas mixture, said installation including at least one heat exchanger operating successively on a feed-cooling cycle to precipitate a condensable component, an exhaust cycle to remove the residual non-condensed gases, a vacuum cycle to remove condensed impurities and a flushing cycle to remove residual precipitate, said method comprising the steps, in sequence, of:
  (a) cooling said heat exchanger to a temperature below that at which a gaseous component of said gas mixture condenses;
  (b) passing the gas mixture containing said component through said heat exchanger to condense said component therein with retention of an uncondensed residue of said gas mixture;
  (c) terminating the flow of said mixture through said heat exchanger upon condensation of the component therein;
  (d) withdrawing from said heat exchanger, after termination of flow, the uncondensed residue remaining therein after step (c) without removing a significant quantity of the condensate of said component; the said heat exchanger comprising three zones of successively decreasing temperatures, separate impurities being deposited in each of the respective zones as discrete condensate;
  (e) thereafter removing at least the major part of the discrete condensate components deposited in said heat exchanger in step (b), without admitting uncondensed residue gas to said respective zones, by applying to each of said respective zones a subatmospheric pressure sufficient to evaporate said condensate by three separate and distinct vacuum pumps and draw the respective volatilized condensate out of each of said zones substantially free from other constituents; and directing the uncondensed gas mixture from step (d) through another part of the heat exchanger from which the major part of the condensate has been removed in step (e); and
  (f) periodically repeating steps (a) to (e).

References Cited

UNITED STATES PATENTS

| 2,107,335 | 2/1938 | Linde et al. | 62—13 XR |
| 2,981,082 | 4/1961 | Sixsmith | 62—13 XR |
| 3,063,247 | 11/1962 | Yendall | 62—13 |
| 3,073,128 | 1/1963 | Becker. | |
| 3,091,093 | 5/1963 | Becker | 62—38 X |
| 3,216,206 | 11/1965 | Kessler | 62—13 |

FOREIGN PATENTS

| 725,157 | 9/1942 | Germany. |
| 894,558 | 4/1962 | Great Britain. |

NORMAN YUDKOFF, *Primary Examiner.*

V. W. PRETHA, *Assistant Examiner.*

U.S. Cl. X.R.

62—30, 38